(12) United States Patent
Hans

(10) Patent No.: US 9,058,498 B2
(45) Date of Patent: Jun. 16, 2015

(54) RUNTIME ENVIRONMENT MANAGEMENT OF SECURE COMMUNICATIONS ON CARD COMPUTING DEVICES

(75) Inventor: Sebastian J. Hans, Berlin (DE)

(73) Assignee: Oracle International Corporation, Redwood City, CA (US)

( * ) Notice: Subject to any disclaimer, the term of this patent is extended or adjusted under 35 U.S.C. 154(b) by 33 days.

(21) Appl. No.: 13/547,274

(22) Filed: Jul. 12, 2012

(65) Prior Publication Data

US 2014/0019746 A1      Jan. 16, 2014

(51) Int. Cl.
| | |
|---|---|
| G06F 21/00 | (2013.01) |
| G06F 21/60 | (2013.01) |
| G06F 21/85 | (2013.01) |
| H04W 4/00 | (2009.01) |
| H04W 12/02 | (2009.01) |

(52) U.S. Cl.
CPC .............. *G06F 21/606* (2013.01); *G06F 21/85* (2013.01); *H04W 4/008* (2013.01); *H04W 12/02* (2013.01); *G06F 2221/2107* (2013.01)

(58) Field of Classification Search
CPC ............................ H04L 63/0815; G06F 21/62
USPC ................. 713/150, 201, 160, 193, 200, 168; 380/229, 149–150, 255; 709/225–226, 709/229
See application file for complete search history.

(56) References Cited

U.S. PATENT DOCUMENTS

| | | | | |
|---|---|---|---|---|
| 2002/0040936 | A1* | 4/2002 | Wentker et al. | 235/492 |
| 2004/0199787 | A1* | 10/2004 | Hans et al. | 713/200 |
| 2005/0071660 | A1* | 3/2005 | Shimizu et al. | 713/193 |
| 2011/0125967 | A1* | 5/2011 | Kim et al. | 711/115 |
| 2011/0296182 | A1* | 12/2011 | Jia et al. | 713/168 |
| 2012/0246476 | A1* | 9/2012 | Zhuang et al. | 713/168 |
| 2013/0227445 | A1* | 8/2013 | Freyhult et al. | 715/762 |

OTHER PUBLICATIONS

Julien Iguchi-Cartigny et al., Developing a Trojan applets in a smart card, Sep. 11, 2009, Springer, pp. 343-351.*

Alvin T.S. Chan, WWW + smart card: towards a mobile health care management system, Jul. 2000, ScienceDirect, vol. 57, Issues 2-3, pp. 127-137.*

(Continued)

*Primary Examiner* — Bradley Holder
*Assistant Examiner* — Fahimeh Mohammadi
(74) *Attorney, Agent, or Firm* — Robert C. Kowert; Meyertons, Hood, Kivlin, Kowert & Goetzel, P.C.

(57) ABSTRACT

A card computing device may be configured to establish and manage secure channel communications between terminal applications and local applications installed on the card computing device. A runtime component of the card computing device may be configured to generate a registry of applications available as endpoints for secure channel communications, either in response to applications registering as endpoints or based on installation parameters on the card computing device. The runtime component may provide a list of the registered applications to a terminal application. The runtime component may establish a secure channel between a terminal application and a local application and may receive and decrypt secure commands from the terminal application. The runtime component may forward the decrypted commands to the local application and encrypt and forward responses from the local application to the terminal application.

18 Claims, 9 Drawing Sheets

(56) References Cited

OTHER PUBLICATIONS

Raja Naeem Akram et al., Application Management Framework in User Centric Smart Card Ownership Model, 2009, Springer0Verlag Berlin Heidelberg, pp. 20-35.*

Ching-Cheng Lee et al., A Component-based Approach for JavaCard Runtime System Development, Jun. 16-20, 2005, IEEE, pp. 274-282.*

GlobalPlatlform Card Specification, (Mar. 2006).

Java Card™ System Protection Profile—Open Configuration—Version 2.6—by Sun Microsystems, (Apr. 19, 2010).

Application Programming Notes, Java Card™ 3 Platform, Classic Edition by Sun Microsystems, (Jul. 2009).

ETSI TS 102 221 V9.2.0, "Smart Cards; UICC-Terminal interface; Physical and logical characteristics" by European Telecommunications Standards Institute, 2010.

ETSI TS 102 484 V10.0.0, "Smart Cards; Secure channel between a UICC and an end-point terminal" by European Telecommunications Standards Institute, 2011.

* cited by examiner

```
┌─────────────────────────────────────────────────────────┐
│ Generating a registry of local applications on a card   │
│ computing device capable of being an endpoint for       │
│ secure communications with a terminal for the card      │
│ computing device                                        │
│                         300                             │
└─────────────────────────────────────────────────────────┘
                            ⋮
                            ▼
┌─────────────────────────────────────────────────────────┐
│ Receiving a request from a terminal application for a   │
│ list of secure communications endpoints on the card     │
│ computing device                                        │
│                         310                             │
└─────────────────────────────────────────────────────────┘
                            ⋮
                            ▼
┌─────────────────────────────────────────────────────────┐
│ Supplying a list of registered applications from the    │
│ registry to the terminal application in response to the │
│ request from the terminal application                   │
│                         320                             │
└─────────────────────────────────────────────────────────┘
                            ⋮
                            ▼
┌─────────────────────────────────────────────────────────┐
│ Receiving a request from the terminal application to    │
│ establish a secure communications channel with a        │
│ specified one of the registered applications            │
│                         330                             │
└─────────────────────────────────────────────────────────┘
                            ⋮
                            ▼
┌─────────────────────────────────────────────────────────┐
│ Establishing a secure communications channel between    │
│ the terminal application and the specified application  │
│                         340                             │
└─────────────────────────────────────────────────────────┘
```

*FIG. 3*

RUNTIME ENVIRONMENT MANAGEMENT OF SECURE COMMUNICATIONS ON CARD COMPUTING DEVICES

BACKGROUND

Card computing devices may provide identification, authentication, data storage and application processing in a variety of systems from mobile phones to automated teller machines and drivers licenses. Various specifications and standards define interfaces and protocols for use between card computing devices and card readers, hosts or terminals. For example, the European Telecommunications Standards Institute (ETSI) has defined a set of protocols and specifications relating to communication between an application on a card computing device and a terminal application.

Java has become a common development platform for creating applications for card computing devices. For instance, Java Card™ is a small Java implementation for embedded devices including card computing devices. Many Java Card™ products also rely on the GlobalPlatform Card Specifications for secure management of applications on a card computing device.

Security of the communications between a card computing device and a host or terminal may be very important to the proper functioning of an overall system. Card computing devices are frequently used for personal identification tasks, partly because they are physically engineered to be tamper resistant. However, secure communications mechanisms between card computing devices and terminal applications are not standardized nor well defined in existing technology. Additionally, traditional security mechanisms frequently involve significant modifications to the individual applications installed on card computing devices.

SUMMARY

Described herein are various embodiments of systems and methods for supporting, establishing and managing secure channel communications between a card computing device and a terminal for the card computing device. For instance, in one embodiment, a runtime component of a card computing device may generate a registry of applications on the card computing device capable of being secure channel endpoints for secure communications with a terminal for the card computing device. In response to receiving, from a terminal, a request for information regarding applications on the card computing device, the runtime component may supply the terminal with information regarding applications in the registry. In addition, the runtime component may receive a request to establish a secure communications channel with one of the applications on the card computing device, and in response may establish the secure communications channel between the requesting terminal and the specified application.

In another embodiment, an application on a card computing device may invoke a registry interface of a runtime component to include an identification of the application in a registry of local applications as an endpoint for secure communications with a terminal. Additionally, an application may receive via the runtime component a request to establish a secure communications channel between a terminal and the application. The application may then return an indication of the application's acceptance of the secure communications channel.

BRIEF DESCRIPTION OF THE DRAWINGS

FIG. 3 is a flowchart illustrating one embodiment of a method for secure channel communication setup on a card computing device, as described herein.

Figure 1:
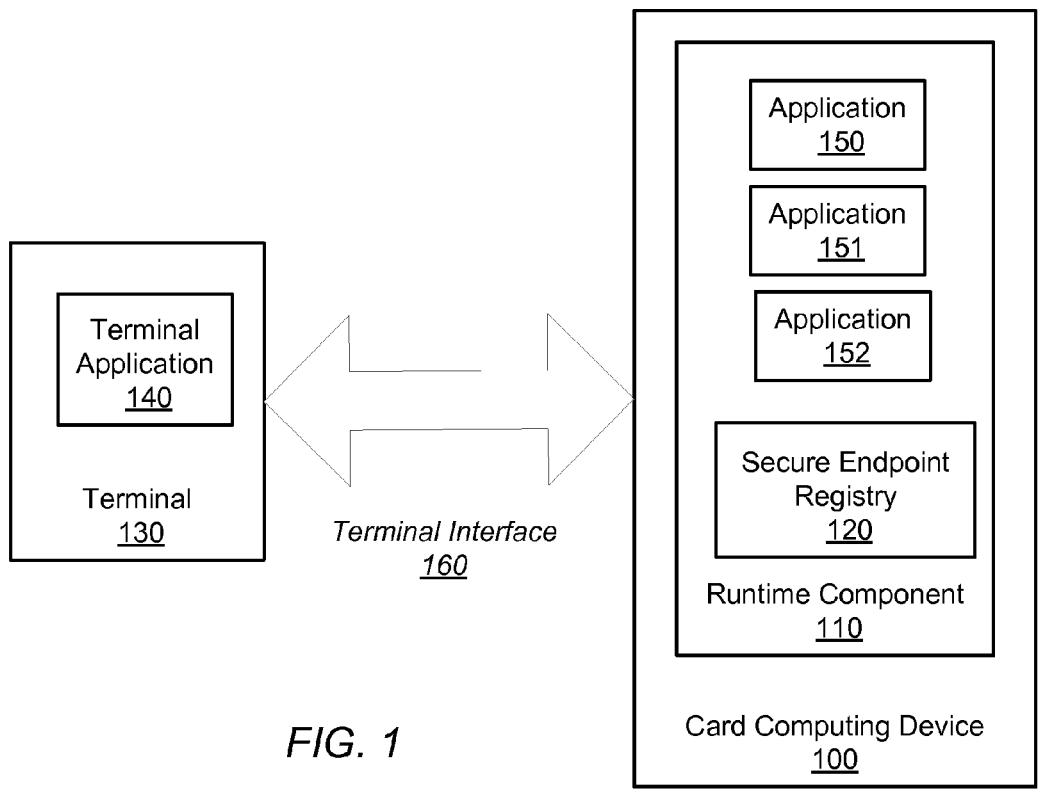
FIG. 1 is a logical block diagram illustrating, according to one embodiment, a system configured to support secure communications between a terminal and a card computing device, as described herein.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As part of supporting secure channel communications, a runtime component of a card computing device may be configured to generate a registry of applications installed on the card computing device that are capable of being endpoints for secure channel communications with applications on a terminal or host for the card computing device. In addition, the runtime component may be configured to provide a requesting terminal a list of the registered applications (i.e., potential secure channel endpoints) on the card computing device, according to some embodiment. A runtime component of the card computing device may also establish and manage one or more secure channels for secure communication between a terminal (e.g., applications installed on the terminal) and one or more of the applications on the card computing device.

A terminal may specify a particular application on the card computing device when requesting a secure channel and the runtime component may be configured to forward the secure channel request to the specified application when determining whether to accept and establish the secure channel. The runtime component may forward some or all of the information regarding a secure channel request (perhaps the actual request message) to the specified application so that the application may determine whether or not to accept the secure channel with the requesting terminal application.

A runtime component may also be configured to manage the secure channel communications between a terminal application and an application installed on the card computing device. For example, the runtime component may establish a security association on behalf of the local application as well as forward commands and responses between the terminal application and the local application. In addition, the runtime component may be configured to decrypt secure commands from the terminal application as well as encrypt responses from the local application, as will be discussed in more detail below. Thus, according to some embodiments, the runtime component of the card computing device may be configured to establish and manage secure channel communicates transparently to the local applications used and endpoints of the communications.

A runtime environment of a card computing device may also include a mechanism to create a secure channel object that links the credentials of the secure channel with an instance of an application on the card computing device. This secure channel object may control the lifecycle of the secure channel and may also handle all commands related to the secure channel, according to various embodiments. A secure channel object may also perform any necessary key agreement with the terminal application.

As illustrated in FIG. 1, a card computing device 100 may include installed software, such as runtime component 110 and applications 150, 151 and 152, according to various embodiments.

As referred to herein, a card computing device may refer to any of various types of pocket-sized cards with embedded integrated circuits, including, but not limited to a smart card, a chip card, an integrated circuit card (ICC), or a universal integrated circuit cards (UICC). A card computing device may be configured for use in various roles in any of various systems, such as to provide identification, authentication, data storage and/or application processing. Card computing devices may also provide strong security authentication for single sign-on (SSO) within large organizations. In various embodiments, card computing devices may include (but not be limited to) credit cards, automated teller machine (ATM) cards, mobile phone subscriber identity module (SIM) cards, drivers licenses, authorization cards for pay television, prepayment cards, high-security identification cards, access control cards and telephone call payment cards. In additional a card computing device may be configured for use as an electronic wallet, such as by recording and managing one or more financial accounts.

A card computing device may be configured to store and execute one or more applications, such as applications 150, 151 and 152, via an operating system or runtime environment. For example, in one embodiment, a card computing device may be configured to store and execute a Java based runtime environment and Java applets, such as according to the Java Card™ specifications.

As used herein, Java Card™ may refer to technology that allows Java-based applications (e.g., applets) to be run securely on a card computing device. In some embodiments, a Java Card™ based card computing device may include a combination of a virtual machine (e.g., Java Card™ Virtual Machine or Java Card™ VM) and a runtime library as well as one or more applets. In some embodiments, a card computing device may be configured to execute a Java Card™ Runtime Environment (JCRE) with one or more Java applets capable to function as secure channel endpoints.

As shown in FIG. 1, card computing device 100 may be configured to communicate over terminal interface 160 with terminal application 140 executing on terminal 130. Card computing device 100 may be configured to communicate with external devices and services, such as terminal 130, via any of various card-reading mechanisms, devices and/or interfaces. For example, in some embodiments, card computing device 100 may include one or more contact pads that may be used as a communications medium between the card computing device and a host or terminal for the card computing device. In other embodiments, a card computing device may be a contactless card computing device configured to communicate with a terminal via radio waves.

When communicating with a host or terminal, a card computing device may be configured to use any of various communications protocols, according to various embodiments. For example, in one embodiment, card computing device 100 may be configured to use the ISO/IEC 7816 communications standard and to exchange pairs of application protocol data unit (APDU) messages with terminal 130 (or terminal application 140). Card computing device 100 may receive command APDUs from terminal 130 while sending response APDUs in return. APDUs may include various fields. For example, a command APDU may include a header and from 0-255 bytes of data while a response APDU may include a status word and from 0-255 bytes of data, according to some embodiments.

Additionally, in some embodiments, messages (e.g., ADPUs) exchanged between a card computing device and a terminal may be used within other communications protocols. For example, the European Telecommunications Standards Institute (ETSI) has defined a secure channel mechanism to communicate between an application on a card computing device and a terminal application where the command and responses (command APDU and Response APDU according to ISO 7816) may be encapsulated within dedicated transaction commands. Thus, in some embodiments, the European Telecommunications Standards Institute (ETSI) protocol may be supported by a runtime component of the card computing device.

As further shown in FIG. 1, runtime component 110 of card computing device 100 may generate a secure endpoint registry 120 of applications installed on card computing device 100 as potential secure channel endpoints, according to various embodiments as will be discussed in more detail below.

Figure 2:
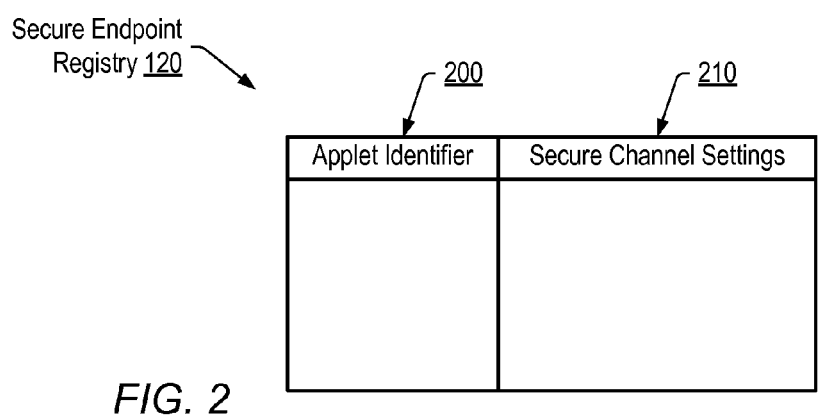
FIG. 2 is an illustration of one embodiment of a secure endpoint registry of a card computing device.
Figure 4:
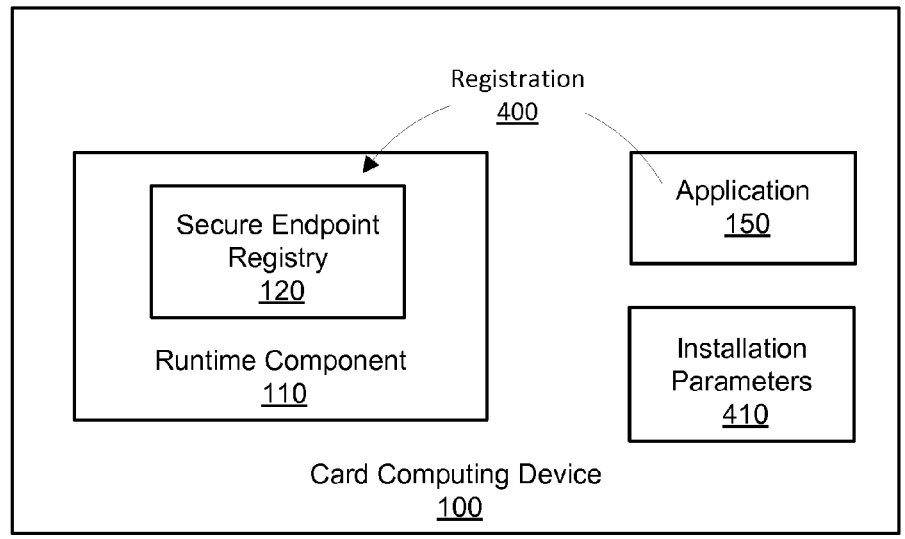
FIG. 4 is a logical block diagram illustrating one embodiment of generating a secure endpoint registry.

FIG. 2 illustrates one embodiment of secure endpoint registry 120. Secure endpoint registry 120 may include information regarding one or more application installed on the card computing device. For example, in some embodiments secure endpoint registry 120 may include an application identifier, such as applet identifier 200 and may also include any of various types of information regarding secure channel settings for an application, such as secure channel settings 210.

FIG. 3 is a flowchart illustrating one embodiment of a method for a runtime component of a card computing device to support secure channel communication setup between a terminal application and a particular application installed on the card computing device. As shown in block 300, and noted above, a runtime component may generate a registry of local applications on a card computing device capable of being an endpoint for secure communications with a terminal for the card computing device.

A card computing device may generate a registry of locally installed applications in various ways according to different embodiments. For example, an application installed on a card computing device, such as application 150, may be configured to register and deregister itself with a runtime component of the card computing device as an endpoint for an application to application secure channel, as illustrated by registration arrow 400, according to some embodiments. In one embodiment a runtime component of the card computing device may provide an interface or API, such as a method or message, via which an application can register as an endpoint for secure channel communications. For example, runtime component 110 may, in some embodiments, expose a static registry function, while in other embodiments, an application may utilize an interface such as may be defined by any of various specifications. For example, in one embodiment, a global service, such as may be retrieved via by a GlobalPlatform global service function, may be utilized for application registration. GlobalPlatform Card Specification may be considered a secure, dynamic card and application management specification that defines card components, command sets, transaction sequences and interfaces for applications on card computing devices.

In other embodiments, applications may not registry themselves at runtime, but instead, runtime component 110 may be configured to build secure endpoint registry 120 from information stored on card computing device 100 at installation. For example, card computing device 100 may have installation parameters 410 installed (e.g., as a stored file, or in immutable memory) and runtime component 110 may be configured to read installation parameters 410 when generating secure endpoint registry 120.

In some embodiments, runtime component 110 may be configured to build secure endpoint registry 120 only from information supplied by applications registering themselves at runtime. In other embodiments, runtime component 110 may be configured to generate secure endpoint registry 120 using only information from installation parameters 410. While in yet other embodiments, runtime component 110 may be configured to generate secure endpoint registry 120 using information from installation parameters 410 and using information supplied by applications registering themselves at runtime.

Figure 5:
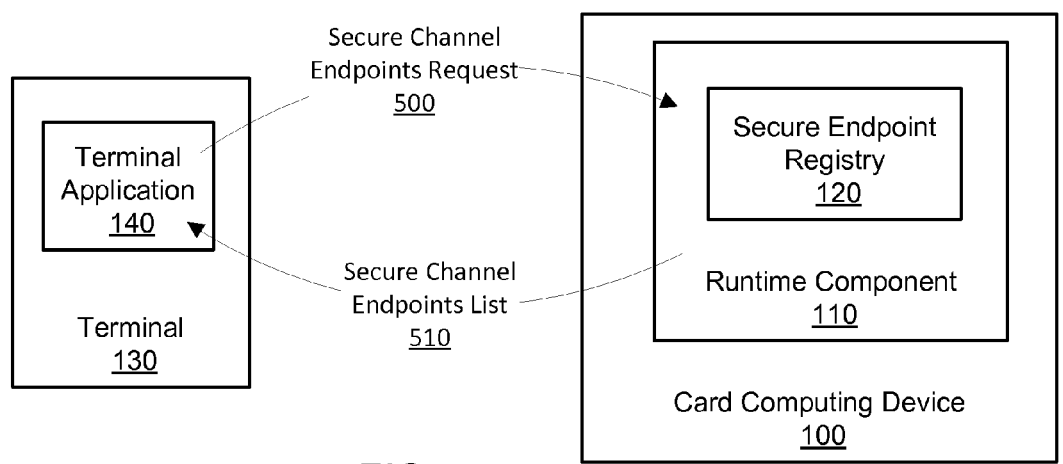
FIG. 5 is a logical block diagram illustrating a card computing device providing a list of potential secure channel endpoints to a terminal, according to one embodiment.

Returning now to FIG. 3, the runtime component may receive a request from a terminal (or terminal application) for a list of secure communications endpoints on the card computing device, as illustrated by block 310 and in response may supply the terminal a list of registered applications from the registry, as shown in block 320, according to some embodiments. Thus, as shown in FIG. 5, runtime component 110 may receive from terminal application 140 a request for a list of secure channel endpoints, as shown by secure channel endpoints request 500. In response to receiving secure channel endpoints request 500, runtime component 110 may supply a list of applications from secure endpoint registry 120, as shown by secure channel endpoints list 510.

Please note that the exact method and nature used by terminal application 140 to request a list of secure channel endpoints on a card computing device and the exact method and nature used by the card computing device to supply such a list may vary from embodiment to embodiment. For example, in one embodiment a terminal application may use an ETSI defined Retrieve UICC Endpoints command (e.g., as part of a Manage Secure Channel ADDU) to discover what, if any, secure channel endpoints are available on a card computing device, while in other embodiments, other message types and/or protocols may be used.

Returning back to FIG. 3, as shown in block 330, a runtime component of a card computing device, such as runtime component 110, may receive a request from a terminal application to establish a secure channel with a specified application, such as one that may have been included in registry list supplied to the terminal application previously. For instance, in one embodiment, a terminal application may use an application identifier, such as an applet identifier 200, to specify a particular application as an endpoint for a requested secure channel. Runtime component 110 may have supplied applet identifier 200 as part of the information included with the list of secure channel endpoints to the terminal. In other embodiments however, the terminal application may specify a particular endpoint application in other ways.

A runtime component of a card computing device may be configured to perform various security procedures when responding to a request to establish a secure channel from a terminal (such as authenticating credential information, shared keys, etc), according to various embodiments. For example, in some embodiments, a runtime component may be configured to establish and manage one or more security associations as part of managing secure channel communications between a terminal application and a local application. In general, a security association (SA), as used herein, may be considered the establishment of one or more shared security attributes between a terminal and a card computing device to support secure communication. Security associations may include various attributes such as an encryption key and an indication of a particular cryptographic algorithm and mode, according to various embodiments.

In some embodiments, a runtime component of a card computing device may be configured to accept and respond to a command from a terminal to establish a master security association (SA). For example, in one embodiment, a runtime component in a Java Card™ based card computing device may be configured to accept an "Establish SA—Master SA" command using a ETSI Manage Secure Channel APDU from a terminal application.

Figure 6:
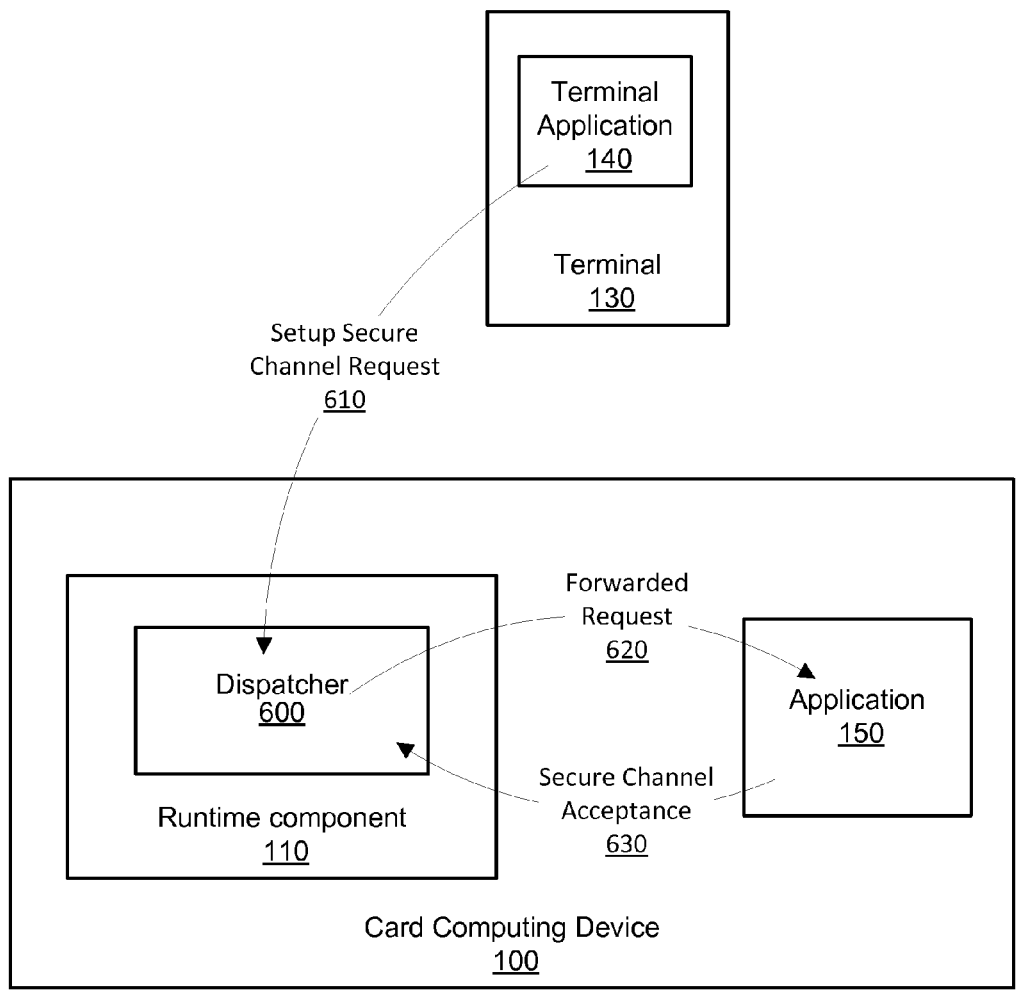
FIG. 6 is a logical block diagram illustrating one embodiment an application installed on a card computing device accepting secure channel communications with a terminal application, as described herein.

Runtime component 110 may, in some embodiments, forward a request from a terminal application for setting up a secure channel to the specified application. For example, as shown in FIG. 6, terminal application 140 may send a request to setup a secure channel with application 150 to card computing device 100, as illustrated by secure channel setup request 610, and runtime component 110 may utilize dispatcher 600 to receive secure channel setup request 610 and forward it to application 150, as shown by forwarded request 620.

Please note that as used herein a dispatcher, such as dispatcher 600, is merely a logical identifier for ease of description and may or may not actually represent a separate entity or object, according to various embodiments. For example, in some embodiments, dispatcher 600 may refer to a programming object that is generated, loaded and/or used by runtime component 110. In other embodiments, however, the functions, methods and/or other features described herein in reference to dispatcher 600 may be performed by runtime component 110 or may be performed by several separate entities or objects.

In response to receiving forwarded request 620, application 150 may determine whether to accept the requested secure channel and may return an appropriate indication to dispatcher 600, as illustrated by secure channel acceptance 630, according to one embodiment. Please note that while described herein as an indication of acceptance of a requested secure channel, secure channel acceptance 630 may indicate either a positive acceptance or a negative acceptance, depending upon whether application 150 determined to accept the requested secure channel or not.

The exact manner and/or method in which dispatcher 600 forwards a secure channel setup request to application 150 and in which application 150 indicates its acceptance (or not) of the requested secure channel may vary from embodiment to embodiment. For instance, in one embodiment, application 150 may expose a public interface including a method, callable by dispatcher 600, which may include various parameters allowing the details of secure channel setup request 610 to be available to application 150 and the return value from the method may indicate whether application 150 accepts the requested secure channel.

Below is an example interface for an application that may be installed on a card computing device configured to use a Java Card™ based system to support secure channel communications as defined herein and according to one embodiment.

```
package uicc.securechannel;
import javacard.framwork.Shareable;
public interface SecureChannel extends Shareable {
public secureSelect( );
public Boolean confirmSecureChannel(byte[ ] buffer, short bOffset,
short bLength);
public void terminateSecureChannel( );
}
```

In the example interface shown above, dispatcher 600 may call the confirmSecureChannel method provided by application 150 with the details of the received secure channel setup request 610 as passed parameters, according to one embodiment. Application 150 may examine the details of the secure channel setup request via the parameters to confirmSecureChannel to determine whether or not to accept the secure channel and return either TRUE or FALSE in the boolean return value, according to one embodiment.

While the description and examples above include only a single secure channel, in some embodiments, runtime component 110 and/or dispatcher 600 may be configured to establish and manage multiple secure channels. For example, dispatcher 600 may be configured to receive multiple secure channel setup requests 610, either from a single or from multiple, separate terminal applications, and forward each request to separate local applications 150. Thus, in some embodiments, dispatcher 600 may be configured to communicate with multiple local applications as well, such as one application for each secure channel setup request. Similarly, in some embodiments, runtime component 110 may be configured to utilize a single dispatcher 600 to manage multiple secure channel setup requests, while in other embodiments runtime component 110 may use multiple dispatchers (e.g., one dispatcher for each secure channel setup request). Additionally, in some embodiments, a single application, such as application 150 may be configured to accept and communicate over multiple secure channels.

Referring back to FIG. 3, runtime component 110 may be configured to establish a secure communications channel between the terminal application and the specified local application, such as application 150, as illustrated by block 340 according to one embodiment. As noted above, runtime component 150 may first forward a secure channel setup request to the specified application and may establish the secure channel between the requesting terminal application and the specified application only if the specified application accepts the secure channel. Thus, in some embodiments, runtime component 110 may not establish a secure channel in response to a request to setup a secure channel. In some embodiments, runtime component 110 may be configured to return a negative acknowledgment or error indication back to the requesting terminal application.

In some embodiments, in addition to specifying a particular application on the card computing device as an endpoint for a secure channel, a terminal application may also cause a particular application of the card computing device to be activated. Such activation may be performed either before or after a secure channel has been established, according to various embodiments. For instance, in one example embodiment an ETSI defined SELECT command (APDU) may be sent to the card computing device outset of the secure channel communication (i.e., before the secure channel has been set up). For example, a SELECT BY AID APDU (as defined by a Java Card™ specification) may be received by the runtime component. In response, the runtime component may forward the SELECT BY AID APDU to the application, such as by invoking a select API method (e.g., secureSelect( )) of the application. If the application selection is performed outside of the secure channel communication, the response from the application to the select command (e.g., a response sent to the terminal application's SELECT BY AID APDU command) may not be secured (e.g., encrypted).

In another embodiment, application selection (e.g., activation) may be performed within the secure channel communication (i.e., after the secure channel is set up). For example, in one embodiment, a SELECT BY AID APDU may be encapsulated within a TRANSACT APDU command and may be processed by the runtime component. The runtime component may verify the security of the TRANACT APDU command and the encapsulated SELECT BY AID APDU may be extracted. Additionally the SELECT BY AID APDU may be forwarded to the application, as described above. When the application selection is performed within the secure channel communications (e.g., a SELECT BY AID APDU encapsulated within a secure TRANSACT APDU), the response APDU from the application may also be secured (i.e., encrypted).

Figure 7:
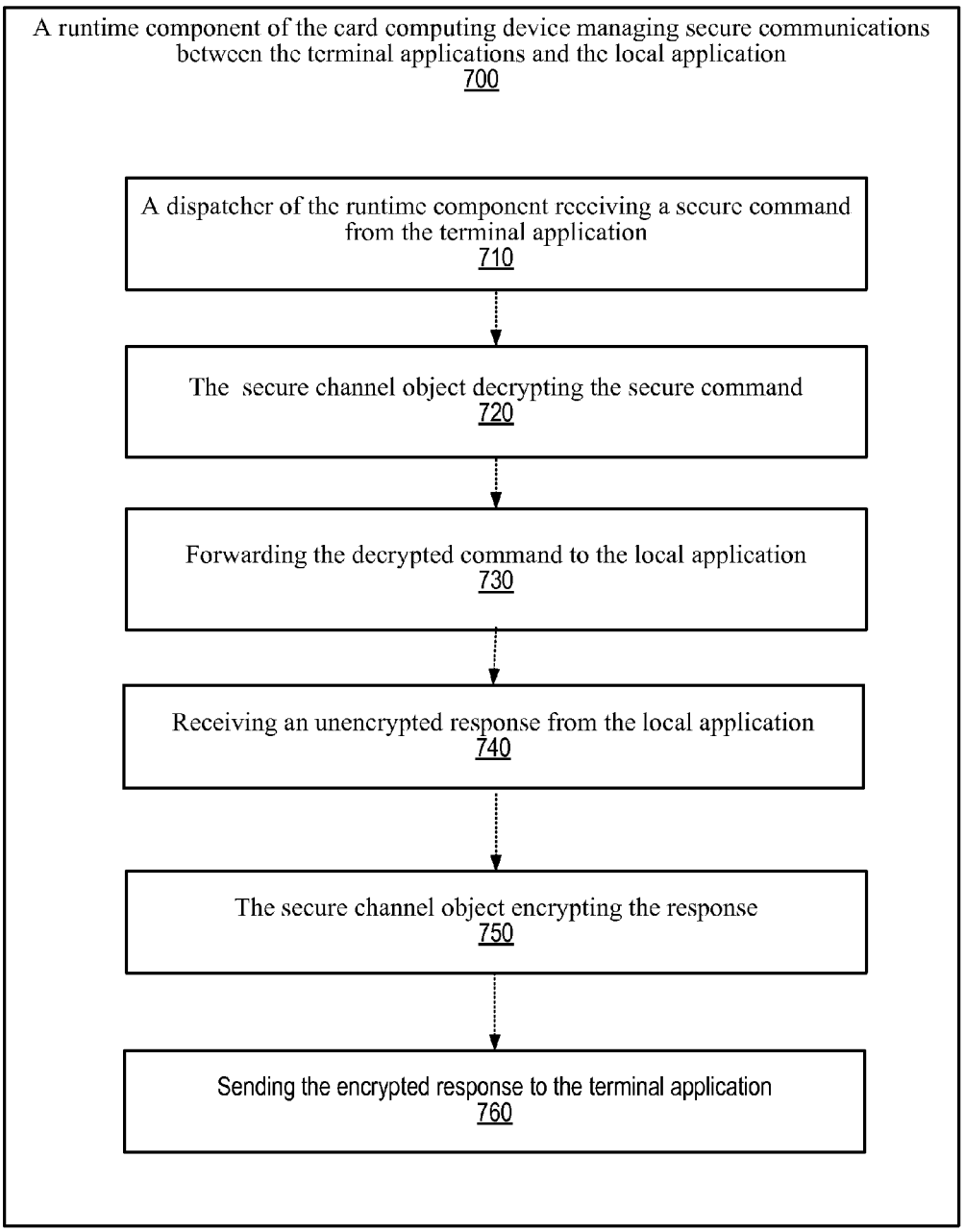
FIG. 7 is a flowchart illustrating one embodiment of a method for a runtime component of a card computing device to manage secure channel communication, as described herein.

FIG. 7 is a flow chart illustrating one embodiment of a method for a runtime component to manage secure communications between a terminal application and a local application. Runtime component 110 may be configured to manage secure communications between a terminal application and a local application, as illustrated in block 700. As illustrated in block 710, a dispatcher of the runtime component, such as dispatcher 600, may receive a secure command from a terminal application. The secure command may be encrypted and runtime component 110 and/or dispatcher 600 may utilize a secure channel object to decrypt the command, as illustrated in block 720, before forwarding the decrypted command to the local application, as illustrated in block 730, according to one embodiment. For example, the dispatcher may receive a secure/encrypted APDU command and forward it to the secure channel object. This secure APDU command may then be decrypted by the secure channel object and inside that decrypted data may be another (encapsulated) APDU command which may then be forwarded to the local application by one of various mechanisms which will be described in more detail below regarding FIG. 8 and FIG. 9. Additionally, the encapsulated APDU may be encapsulated within more than one APDU command messages (e.g. transport messages) and the secure channel object may extract and reassemble the encapsulated secure command such that the local application may only see the complete APDU message, according to some embodiments. The exact methods and manner in which the secure command is communicated, both before and after it is extracted and/or decrypted, may vary from embodiment to embodiment, and will be discussed in more detail below regarding FIG. 8 and FIG. 9.

Please note that while described herein as encrypting and/or decrypting data, a secure channel object may be configured to use any of various cryptographic algorithms, including, but not limited to, symmetric key algorithms such as the Data Encryption Standard (DES), Triple DES, Advanced Encryption Standard (AES), and asymmetric key algorithms such as RSA, elliptic curve cryptography, as well as other cryptographic services like signing, key generation, key agreement and key exchange.

In response to forwarding the extracted and decrypted command to the local application, as illustrated in block 730, the dispatcher may receive an unencrypted response from the local application, as illustrated by block 740 of FIG. 7. A secure channel object may then encrypt the response, as shown in block 750, and the encrypted response may be sent to the terminal application as in block 760. For example, the local application (e.g., an applet) may respond to an encapsulated APDU and the secure channel object will secure/encrypt this response including the APDU status word and send the encrypted response to the terminal (i.e., via the dispatcher) as an encapsulated response in a response APDU, according to some embodiments.

Figure 8:
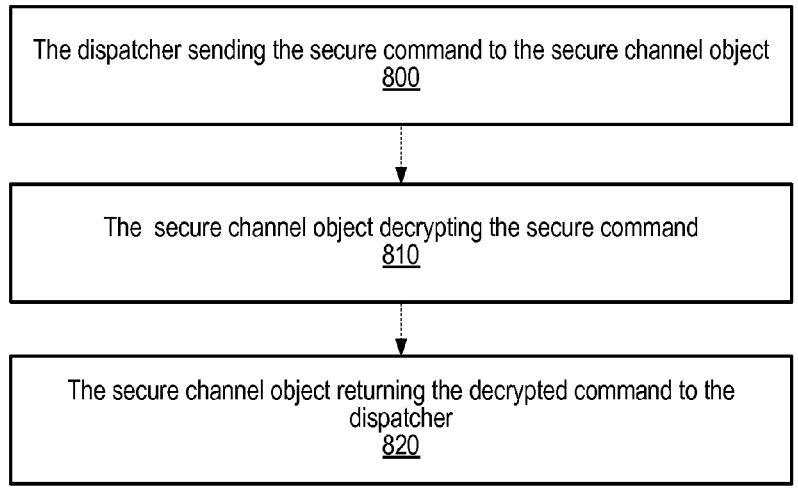
FIG. 8 is a flowchart illustrating one embodiment of a method for a dispatcher to utilize a secure channel object for decryption during secure channel communications.

FIG. 8 is a flowchart illustrated one method for using a secure channel object when managing secure channel communications, as described herein. In one embodiment, a dispatcher may be configured to send a received secure command to a secure channel object, as shown in block 800. The secure channel object may then decrypt the secure command, as illustrated in block 810, before returning the decrypted command to the dispatcher, as in block 820, according to some embodiments.

Command and response messages may sent between a terminal and a card computing device using any of various communications and messaging protocols, according to different embodiments. Additionally, as noted above, the secure command may be encapsulated within one or more transport messages. Thus the secure channel object may, in some embodiments, be configured to extract and reassemble the secure command, and then decrypt the extracted secure command, before retuning the decrypted command to the dispatcher. For example, in one example embodiment based on the ETSI specification, a secure command may be sent as a command APDU encapsulated within multiple transport APDUs. The secure channel object may receive the multiple transport APDUs from the dispatcher, extract and reassemble the command APDU, and then decrypt the secure command from the extracted command APDU. In other words, a secure channel object may be responsible for performing various functions (e.g., extraction, reassembly and decryption) upon the received secure command such that the local application may not have full knowledge of the underlying communications protocol. In other embodiments, information about the transport mechanism and security layer may be provided to the application; however, the secure communication functions (e.g., extraction, reassembly, and/or decryption) would still be performed by the secure channel object.

Figure 9:
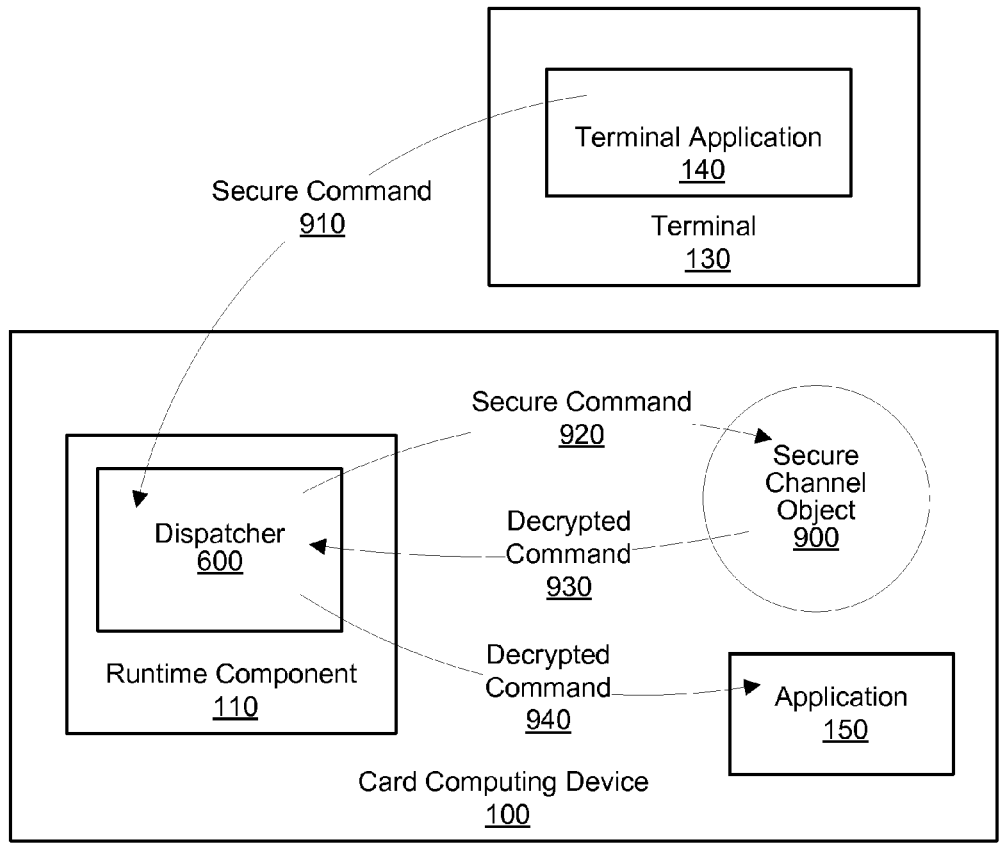
FIG. 9 is a logical block diagram illustrating delivery of a command from a terminal application to an application installed on a card computing device, according to one embodiment.

FIG. 9 is a block diagram illustrating that, according to one embodiment, dispatcher 600 may receive secure command 910 from terminal application 140 and forward it as secure command 920 to secure channel object 900. In some embodiments, dispatcher 600 may forward secure command 910 to secure channel object 900 unchanged (i.e., exactly as received) and thus secure command 920 may be identical to secure command 910. In other embodiments, dispatcher 600 may provide only a part of the entire received secure command 910 as secure command 920 to secure channel object 900.

In some embodiments, dispatcher 600 may be configured to extract an encrypted command from within one or more transport data message (e.g., depending up the exact communications protocol used) before sending the encrypted command (e.g., as secure command 920) to secure channel object 900. For example, in a Java Card™ based system utilizing the ETSI communications standards, secure command 910 may represent a particular encrypted command APDU encapsulated within one or more transport APDUs (which may also be encrypted) and decrypted command 930 may represent the extracted and decrypted command APDU. In some embodiments, dispatcher 600 may be configured to extract a command APDU from a transport APDU, while, in other embodiments, secure channel object 900 may extract the command APDU from the transport APDU.

The exact method and manner in which dispatcher 600 may communicate secure command 920 to secure channel object 900 may vary from embodiment to embodiment. For example, in one embodiment, secure channel object 900 may be a programming object (e.g., a Java object) and dispatcher 600 may call a method of an interface exposed by secure channel object. In another embodiment, dispatcher 600 may utilize a messaging interface (e.g., send a message) to communicate secure command 920 to secure channel object 900.

After receiving a secure command from a dispatcher and after possibly extracting the command APDU from within a transport APDU, secure channel object 900 may decrypt the secure command and return the decrypted command to the dispatcher, as illustrated in FIG. 9 by decrypted command 930 between secure channel object 900 and dispatcher 600. Decrypted command 930 may be communicated from secure channel object 900 to dispatcher 600 in vary ways according to different embodiments. For example, in one embodiment, secure channel object 900 may return decrypted command 930 via a parameter of a method called by dispatcher 600 when forwarding secure command 920 to secure channel object 900. In another embodiment, secure channel object 900 may use a messaging interface (e.g., send a message) to communicate decrypted command 930 to dispatcher 600.

As noted above, in some embodiments, runtime component 110 may utilize a secure channel object when managing secure communications. The exact lifecycle of a secure channel object may vary from embodiment to embodiment. In some embodiments, a secure channel object and session credentials may be created dynamically as part of the establishment of a secure channel after a chain of commands, such as may be defined by the ETSI specifications. The object and/or the session credentials may later be deleted due to any of various conditions, including, but not limited to, a reset of the card computing device, the explicit termination of a secure channel (e.g., by a termination command) and/or a different local application is selected (i.e., activated) on the card computing device.

In other embodiments however, a runtime component may pre-allocate a secure channel object in a non-initialized state that may be initialized and used during the setup of a secure channel. For example, in some embodiments, the card computing device and/or its runtime environment may not support the deletion of programming objects, and thus a secure channel object may be present throughout the execution of the card computing device. When the secure channel object initialized, session credentials for the particular secure channel may be derived and/or initialized as well, either by the secure channel object or by some other component of the card computing device. Instead of being deleted when a secure channel is terminated, a pre-allocated secure channel object and session credentials may reset to an uninitialized state (e.g., set to zero), ready to be reused for subsequent secure channel communications.

As noted above regarding block 730 of FIG. 7, a decrypted command may be forwarded to the local application, as illustrated by the decrypted command 940 arrow between dispatcher 600 and application 150 of FIG. 9. In some embodiments, decrypted command 940 may be identical to decrypted command 930, while in other embodiments, decrypted command 940 may represent another entity that includes the information and/or content of decrypted command 930. For example, in one embodiment, dispatcher 600 may encapsulate decrypted command 930 into a data object to be passed as a parameter to application 150.

Dispatcher 600 may forward a decrypted command to an application in any of various manners, according to various embodiments. For example, in one embodiment, dispatcher 600 may send decrypted command 940 via a parameter of a method called by dispatcher 600 when forwarding decrypted command 940 to application 150. In another embodiment, dispatcher 600 may use a messaging interface (e.g., send a message) to communicate decrypted command 940 to application 150.

Secure channel object 900 may be configured to control the lifecycle of the secure channel and may also handle all commands related to the secure channel, according to various embodiments. For example, in one embodiment, secure channel object 900 may perform any necessary key agreement with a terminal application and may also extract and decrypt command APDUs from their encapsulating transaction APDUs.

While the description and examples above refer to a single secure channel and a single secure channel object, in some embodiments, runtime component 110 and dispatcher 600 may establish and manage multiple secure channels at the same time. Similarly, some embodiments may involve multiple secure channel objects. For example, runtime component 110 and/or dispatcher 600 may create and/or utilize a separate secure channel object for each of multiple secure channels. Thus, in some embodiments, a single dispatcher, such as dispatcher 600, may be configured to receive secure commands from multiple secure channels and to determine which of multiple secure channel objects to send each received secure command. In other embodiments, however, runtime component 110 may generate or use a separate dispatcher for each secure channel. In other words, some embodiments may involve sets of dispatchers, secure channels and secure channel objects, while other embodiments may involve a single dispatcher managing multiple pairs of secure channels secure channel objects.

When managing multiple secure channels, any of various methods and/or mechanisms may be used to match commands and responses to the appropriate terminals and applications. For example, in a Java Card™ based system, a special APDU object may be utilized that includes information regarding which secure channel a secure command or APDU was transported. This information may be included with the decrypted command when it is returned to the dispatcher and forwarded to the application.

As noted above, a local application may send a response to a terminal application, as shown in block 740 of FIG. 7. Thus, a runtime component may receive an unencrypted response from the local application, a secure channel object may encrypt the response, and the runtime component may send the encrypted response to the terminal application, according to some embodiments.

Figure 10:
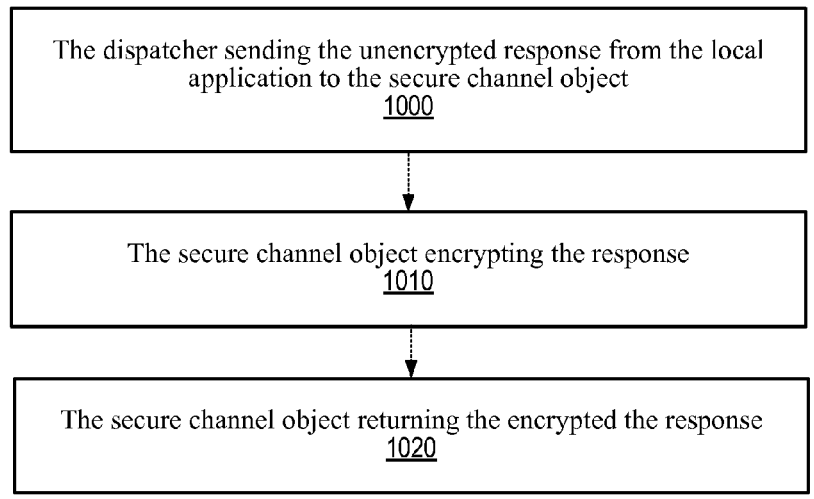
FIG. 10 is a flowchart illustrating one embodiment of a method for a dispatcher to utilize a secure channel object for encryption during secure channel communications.

FIG. 10 illustrates one embodiment of a method for using a secure channel object to encrypt an application response. As shown in block 1000, a dispatcher may send the unencrypted response to a secure channel object, the secure channel object may encrypt the response, as shown in block 1010, and the secure channel object may return the encrypted response to the dispatcher, as illustrated in block 1020.

For example, as described above regarding FIG. 8-9, a local application may receive a secure command sent by a terminal application which may have been encapsulated within one or more transport messages. In some embodiments, a secure channel object may have extracted, reassembled and decrypted the command ultimately received by the local application. In response, the local application may send a response back to the terminal application. In some embodiments, the local application may send an unencrypted response to the dispatcher and the dispatcher may utilize the secure channel object not only to encrypt the response, but also to encapsulate it within one or more transport messages.

For example, a secure channel object may be configured to encrypt the local application's response into a response APDU and then may encapsulate that encrypted response APDU into one or more other APDUs. In other words, a secure channel object may be responsible for performing various functions (e.g., encryption and encapsulation) on the local application's response such that the local application may not need full knowledge of the underlying communications protocol.

In some embodiments, the dispatcher, secure channel object and local application may use a special flag to indicate whether or not the response should be encapsulated within one or more transport messages. For example, an APDU object of the runtime component (or dispatcher) may have an additional flag indicating that it carries a decrypted encapsulated APDU. When the local application responds to this APDU, the runtime component may take such a flagged response APDU and hand it over to the secure channel object, which may secure the response of the application according to rules defined for that secure channel object. This may secure the entire response APDU, including the APDU status word. Such a flag can be communicated among the various entities of the card computing device either within or in addition to the response itself, according to various embodiments.

Figure 11:
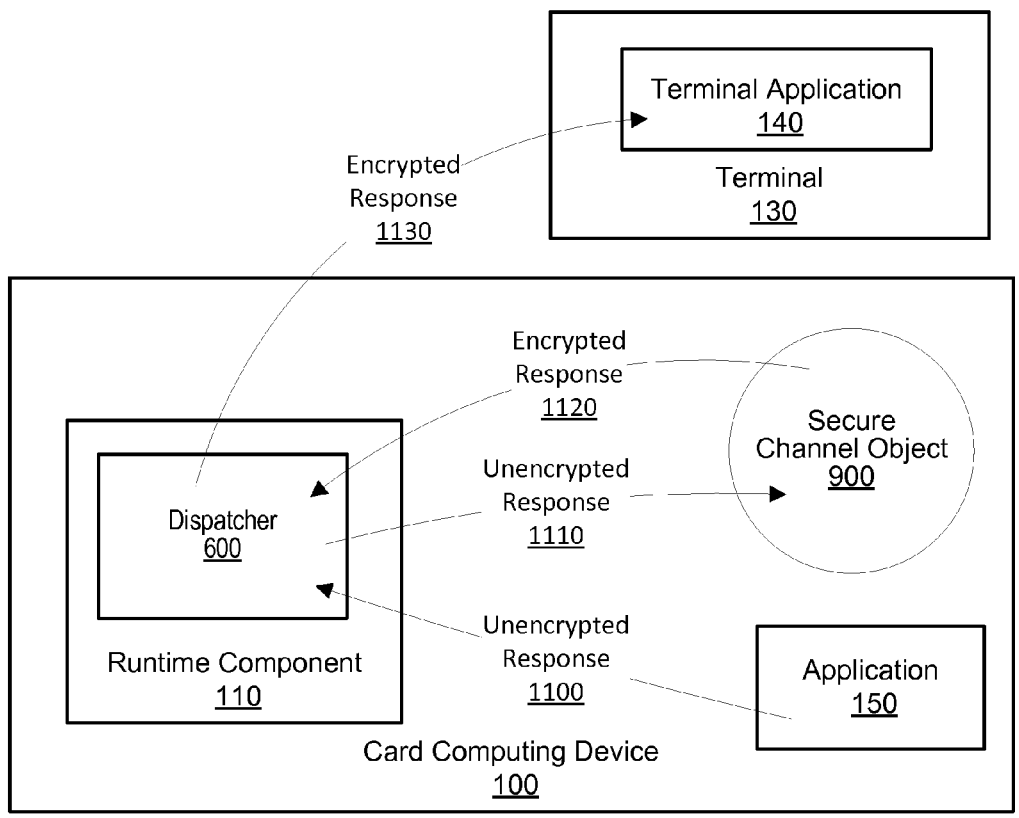
FIG. 11 is a logical block diagram illustrating a card computing device delivering a response, encrypted by a secure channel object, to a terminal, according to one embodiment.

Thus, as shown in FIG. 11 according to one embodiment, dispatcher 600 may receive unencrypted response 1100 from application 150 and forward the unencrypted response (as unencrypted response 1110) to secure channel object 900 for encryption. After encrypting the response, secure channel object 900 may return encrypted response 1120 to dispatcher 600 and dispatcher 600 may send the encrypted response (as encrypted response 1130) to terminal application 140.

For example, in a Java Card™ based system using the ETSI communications standards, secure channel object 900 may be configured to first encrypt a local application's response (received via a dispatcher) into a response APDU and then encapsulate the response APDU within one or more transport APDUs, before sending the transport APDU(s) back to dispatcher 600 for delivery to the terminal. Thus, in some embodiments, encrypted response 1120 may represent one or more transport APDUs that may encapsulate an encrypted APDU version of the local application's unencrypted response 1100.

As noted above regarding FIG. 9, in some embodiments, dispatcher 600 may be configured to communicate with multiple secure channel objects, such as when managing multiple secure channels at the same time. Thus, dispatcher 600 may be configured to determine which of multiple secure channels to send a particular encrypted response. Similarly, in some embodiments, runtime component 110 may be configured to utilize multiple dispatchers, such as a single dispatcher for each of multiple secure channels and secure channels object pairs.

Figure 12:
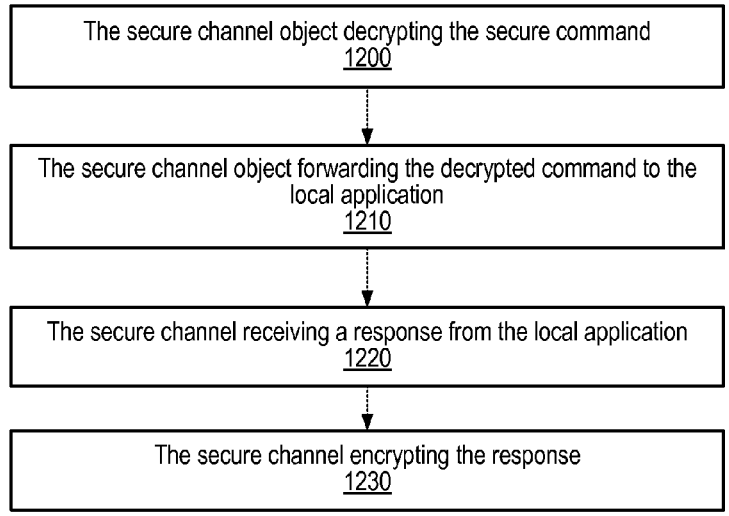
FIG. 12 is flowchart illustrating one embodiment of a method for a dispatcher of a card computing device to utilize a secure channel object to communicate with an application installed on card computing device during secure channel communications, as described herein.

In contrast to embodiments described above regarding FIGS. 8, 9, 10 and 11, in some embodiments, a runtime component (and/or a dispatcher) may rely on a secure channel object to communicate directly with a local application. FIG. 12 is a flowchart illustrating one embodiment of method for using a secure channel object to communicate with a local application directly.

As described above, after receiving a secure command from a terminal application, the dispatcher may, in some embodiments, send the secure command to a secure channel object. After decrypting the secure command, as discussed above, and illustrated in block 1200, the secure channel object may forward the decrypted command to the local application, as shown in block 1210. Furthermore, the secure channel object may receive the unencrypted response from the local application, as shown in block 1220 and may then encrypt the response, as illustrated in block 1230, according to some embodiments.

Thus, in some embodiments, the dispatcher may utilize the secure channel object not only to decrypt secure command and encrypt responses, but may also rely on the secure channel object to communicate with the local application.

Figure 13:
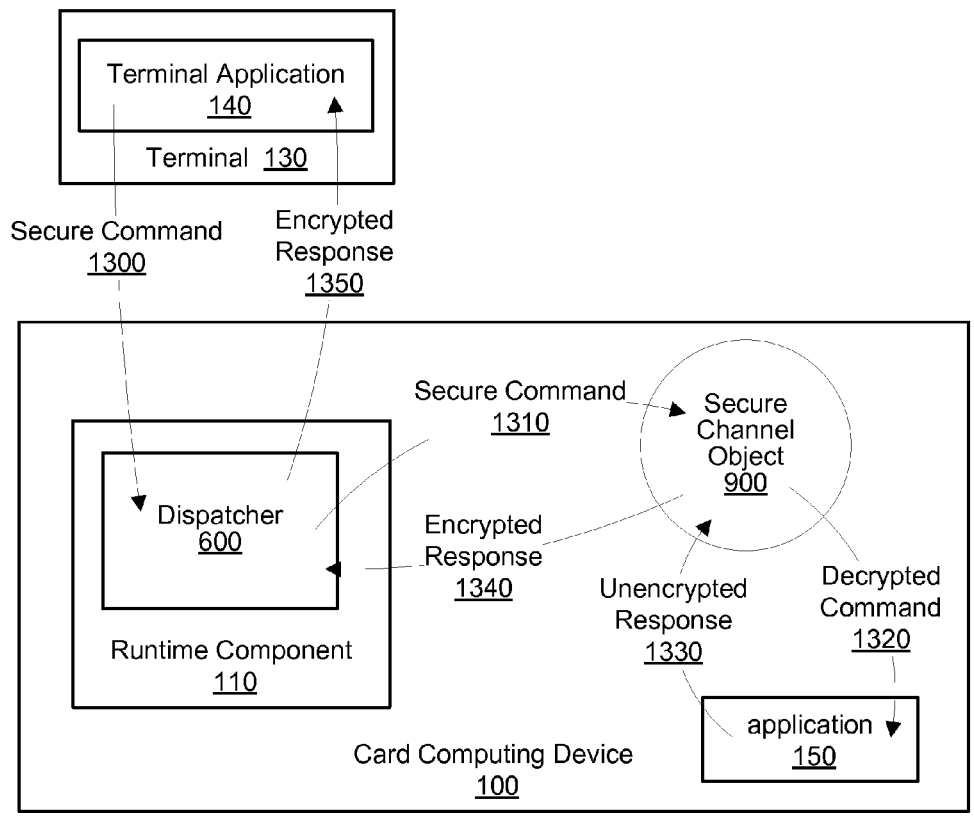
FIG. 13 is a logical block diagram illustrating, according to one embodiment, a dispatcher utilizing a secure channel object to communicate with an application installed on card computing device during secure channel communications, as described herein.

FIG. 13 is a block diagram illustrating one embodiment of a system in which the dispatcher relies on the secure channel object to communicate with the local application. As shown in FIG. 13, dispatcher 600 may receive secure command 1300 from terminal application 140, and may forward the command, as secure command 1310, to secure channel object 900. Secure channel object 900 may then decrypt the secure command and forward the decrypted command 1320 to application 150. Secure channel object 900 may encrypt an unencrypted response 1330 received from application 150 and may then forward the encrypted response 1340 to dispatcher 600. Dispatcher 600 may then send the encrypted response, as encrypted response 1350, to terminal application 140.

As noted previously, in an example embodiment using the ETSI communications standards, secure channel object 900 may be configured to receive one or more transport APDUs, then extract and decrypt the encapsulated command APDU from the transport APDU(s). Similarly, a secure channel object may forward the decrypted command APDU to the appropriate local application (e.g., an applet in a Java Card™ based system) and to receive an unencrypted response from the application. The secure channel object may then encrypt the response as a response APDU and encapsulate the response APDU in one or more transport APDUs to send to the dispatcher for return to the terminal application.

As noted above regarding dispatcher 600, secure channel object 900 may, in some embodiments, be configured to communicate with multiple local applications, such as to manage multiple secure channels simultaneously. In one embodiment, secure channel object 900 may be configured to determine which of multiple applications to send a particular decrypted command. In other embodiments, however, dispatcher 600 may be configured to communicate with multiple secure channel objects, each managing commands and responses for a single secure channel, as described above. Alternatively, some embodiments may involve multiple pairs of dispatchers and secure channel objects, such as to have each pair manage a single secure channel between a terminal application and a local application.

Figure 14:
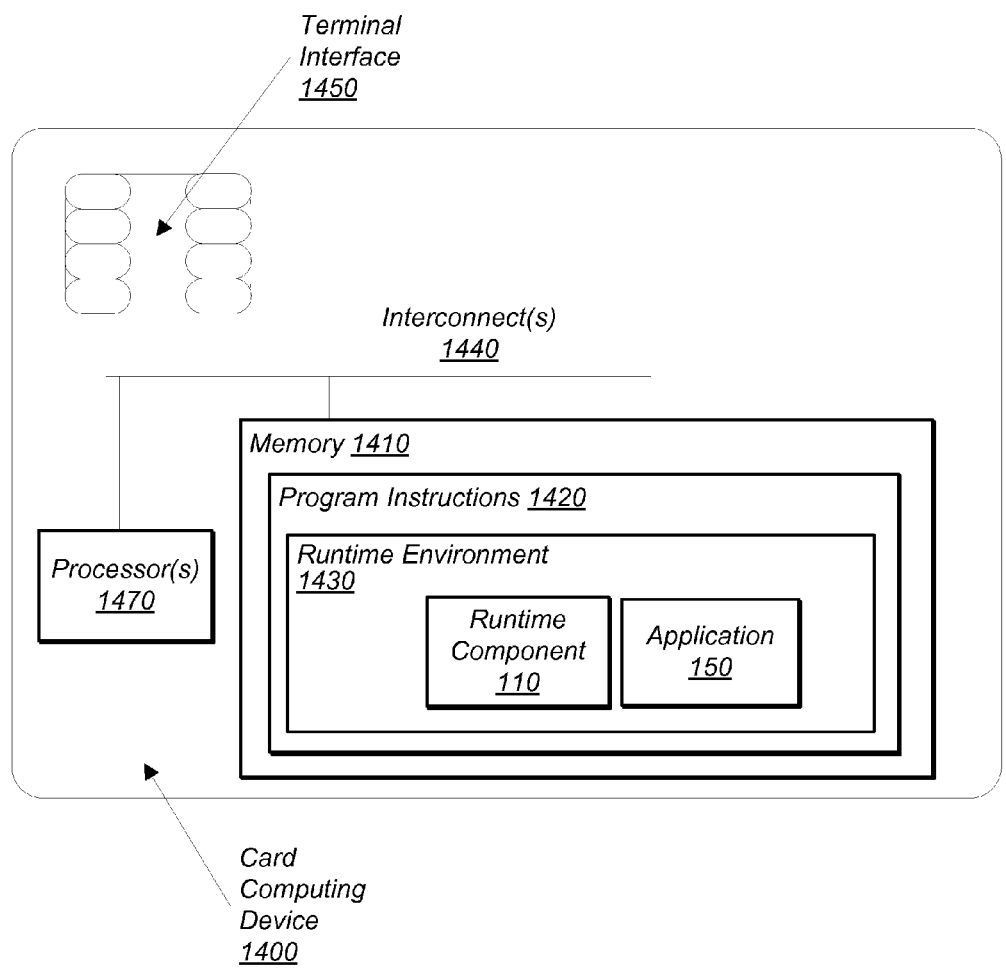
FIG. 14 is a block diagram illustrating one embodiment of a card computing device configured to implement secure channel communications, as described herein.

The techniques described herein for establishing and managing secure channel communications on a card computing device may be implemented in any of a wide variety of computing systems. FIG. 14 illustrates a card computing device configured to implement establishing and managing secure channel communications, as described herein and according to various embodiments.

Card computing device 1400 may be any of various types of pocket-sized cards with embedded integrated circuits, including, but not limited to a smart card, a chip card, an integrated circuit card (ICC), or a universal integrated circuit cards (UICC), credit card, automated teller machine (ATM) card, mobile phone subscriber identity module (SIM) card, authorization card for pay television, pre-payment card, high-security identification card, access control card and telephone call payment card. Card computing device 1400 may be configured for use in various roles in any of various systems, such as to provide identification, authentication, data storage and/or application processing.

As described herein, card computing device 1400 may be configured to communicate with external devices and services via any of various card-reading devices and/or interfaces. For example, in some embodiments, card computing device 1400 may include one or more terminal interfaces 1450. In some embodiments, terminal interface 1450 may be a communications medium between the card computing device and a host or terminal for the card computing device. Terminal interface 1450 may be configured to communicate according to any of various protocols, including but not limited to Single Wire Protocol (SWP) and Host Controller Interface (HCI) specifications.

In some embodiments, terminal interface 1450 may include a contact area comprising several electrically conductive contact pads which may provide electrical connectivity when inserted into a terminal, host or other card reader. In other embodiments, terminal interface 1450 may comprise a contactless communication device configured to communicate with a terminal via radio waves.

While described herein mainly in reference to pocket-sized integrated circuit cards, the methods and techniques described herein may also be performed on other computing devices. Thus, in some embodiments, card computing device 1400 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In some embodiments, the methods described herein may be implemented by a computer program product, or software, that may include a non-transitory, computer-readable storage medium having stored thereon instructions, which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A card computing device 1400 may include a processor unit 1470 (possibly including an integrated circuit, a self-programmable one-chip microcomputer (SPOM), multiple processors, a single-threaded processor, a multi-threaded processor, a multi-core processor, etc.) which may be configured to execute a runtime environment, such as runtime environment 1430 including one or more components or applications, such as runtime component 110 and application 150, which may be present within program instructions 1420 stored in memory 1410 of the same card computing device 1400 on which runtime environment 1430 is executed or may be present within program instructions stored within a memory of another computer system similar to or different from card computing device 1400.

The card computing device 1400 may include one or more system memories 1410 (e.g., one or more of cache, SRAM DRAM, RDRAM, EDO RAM, DDR RAM, SDRAM, Rambus RAM, EEPROM, etc.) which may be mutable or immutable, a system interconnect 1440 (e.g., LDT, PCI, ISA, etc.), and a terminal interface 1450 (e.g., an ATM interface, an Ethernet interface, a Frame Relay interface, etc. The memory medium may include other types of memory as well, or combinations thereof. In other embodiments, card computing device 1400 may include more, fewer, or different components than those illustrated in FIG. 14. The processor(s) 1470, the terminal interface 1450 and the system memory 1410 may be coupled to the system interconnect 1440.

One or more of the system memories 1410 may include program instructions 1420 configured to implement some or all of the techniques described herein for establishing and managing secure channel communications (according to any of the embodiments described herein). For example, one or more of the system memories 1410 may include code to implement and/or execute runtime environment 1430, application 150 and/or runtime component 110, according to one embodiment.

In various embodiments, program instructions 1420, runtime environment 1430, application 150, runtime component 110, and/or individual sub-modules of these components may each be implemented in any of various programming languages or methods. For example, in one embodiment, application 150 and/or runtime component 110 may be JAVA based, while in another embodiment, they may be written using the C or C++ programming languages. Similarly, runtime environment 1430 may be written using Java, C, C++, or another programming language, according to various embodiments. Moreover, in some embodiments, runtime environment 1430, application 150, runtime component 150, and various sub-modules of these components may not be implemented using the same programming language.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
performing, by a card computing device:
generating a registry of local applications installed on the card computing device, where each registered local application is a potential secure channel endpoint for secure communications with a terminal for the card computing device;
receiving, by a runtime component of the card computing device from the terminal, a request for information regarding applications installed on the card computing device;
supplying, in response to the request for information and by the runtime component to the terminal, information from the registry of local applications, the information comprises a list of one or more of the registered local applications;
receiving, by the runtime component, a request from the terminal to establish a secure communications channel with a specified one of the registered local applications from the list of one or more registered local applications;
establishing, by the runtime component, the secure communications channel between the terminal and the specified registered local application, said establishing the secure communications channel comprises:
providing, by the runtime component to the specified registered local application, information regarding the secure communications channel; and
receiving, by the runtime component, an indication from the specified registered local application of the application's acceptance of the secure communications channel.

2. The method of claim 1, wherein said generating the registry of local applications comprises:
receiving, by the runtime component, information from one or more of the installed local applications regarding each application's availability as a secure channel endpoint, wherein the information comprises an application ID corresponding to the respective application; and
adding, by the runtime component, the information to the registry of local applications.

3. The method of claim 1, wherein said generating the registry of local applications comprises reading, by the runtime component, a file installed on the card computing device, wherein the file includes information about each of the local applications regarding each application's availability as a secure channel endpoint.

4. The method of claim 1, further comprising managing, by the runtime component, secure communications over the secure communications channel between the terminal and the specified local application.

5. The method of claim 1, further comprising receiving, by the runtime component, a select command from the terminal to activate the specified registered local application.

6. The method of claim 4, wherein said managing comprises:
receiving, by a dispatcher of the runtime component, an encrypted secure command over the secure communications channel from the terminal;
decrypting, by a secure communications object of the runtime component, the secure command; and
forwarding the decrypted secure command to the specified registered local application.

7. The method of claim 6, wherein said forwarding comprises forwarding, by the secure communications object, the decrypted secure command to the specified registered local application.

8. The method of claim 6, wherein said decrypting further comprises:
providing, by the dispatcher, the encrypted secure command to the secure communications object; and
receiving, by the dispatcher, the decrypted secure command from the secure communications object.

9. The method of claim 8, wherein said forwarding comprises forwarding, by the dispatcher, the decrypted secure command to the specified registered local application.

10. The method of claim 4, wherein said managing further comprises:
receiving an unencrypted response to the secure command from the specified registered local application;
encrypting, by a secure communications object of the runtime component, the unencrypted response from the specified registered local application; and
forwarding, by a dispatcher of the runtime component, the encrypted response to the terminal over the secure communications channel.

11. The method of claim 10:
wherein said receiving the unencrypted response to the secure command comprises:
receiving, by the dispatcher of the runtime component, the unencrypted response from the specified registered local application; and
wherein said encrypting comprises:
providing, by the dispatcher, unencrypted the response to the secure communications object; and
receiving, by the dispatcher, the encrypted response, from the secure communications object.

12. The method of claim 10, wherein said receiving the unencrypted response to the secure command comprises:
receiving, by the secure communications object, the unencrypted response from the specified registered local application; and
receiving, by the dispatcher, the encrypted response, from the secure communications object.

13. A non-transitory, computer-readable storage medium storing program instructions for an application that when executed on a card computing device cause the application on the card computing device to perform:
invoking, by the application installed on the card computing device, a registry interface of a runtime component of the card computing device to include an identification of the application in a registry of local applications as an endpoint for secure communications with a terminal for the card computing device;
where the runtime component is configured to supply information from the registry to the terminal in response to a request from the terminal;
receiving, by the application from the runtime component of the card computing device, a request to establish a secure communications channel between the terminal and the application, where the terminal requested the secure communication channel from the runtime component; and
returning, by the application to the runtime component, an indication of the application's acceptance of the secure communications channel;
where the runtime component is configured to establish the secure communications channel between the terminal and the application in response to receiving the application's acceptance of the secure communications channel; and
where the runtime component is configured to manage secure communications over the secure communications channel between the terminal and the application.

14. The medium of claim 13, further comprising program instructions that when executed cause the card computing device to perform:
receiving, by the application, from the runtime component, a decrypted secure command sent to the application by the terminal over the secure communication channel;
sending, by the application to the runtime component, an unencrypted response to the secure command, wherein the runtime component encrypts the unencrypted response prior to forwarded the response to the terminal.

15. A system, comprising a card computing device, the card computing device comprises:
one or more hardware processors;
memory coupled to the one or more hardware processors, the memory stores program instructions that when executable on the one or more hardware processors cause the one or more hardware processors to:
generate a registry of local applications installed on the card computing device, where each registered local application is a potential secure channel endpoint for secure communications with a terminal for the card computing device;
receive, by a runtime component of the card computing device from the terminal, a request for information regarding applications installed on the card computing device;
supply, by the runtime component to the terminal in response to the request for information, information from the registry of local applications, the information comprises a list of one or more of the registered local applications;

receive, by a runtime component, a request from the terminal to establish a secure communication channel with a specified one of the registered local applications from the list of one or more registered local applications;

establish, by the runtime component, a secure communications channel between the terminal and the specified registered local application, where to establish the secure communications channel the runtime component is configured to:

provide to the specified registered local application, information regarding the secure communications channel; and receive an indication from the specified registered local application of the application's acceptance of the secure communications channel;

manage, by the runtime component, secure communications over the secure communications channel between the terminal and the specified registered local application.

16. The system of claim 15, wherein the memory stores further program instructions that when executable cause the one or more hardware processors to:

receive, by a dispatcher of the runtime component, a secure command from the terminal over the secure communications channel;

decrypt the secure command by a secure communications object;

forward the decrypted secure command to the specified registered local application;

receive, by the dispatcher from the specified registered local application, a response to the secure command;

encrypt the response by the secure communications object; and send the response, by the dispatcher, to the terminal over the secure communications channel.

17. The system of claim 16, wherein the secure communications object is configured to forward the decrypted secure command to the specified registered local application.

18. The system of claim 16, wherein the secure communications object is configured to receive the response from the specified registered local application.

* * * * *

UNITED STATES PATENT AND TRADEMARK OFFICE
CERTIFICATE OF CORRECTION

| | | |
|---|---|---|
| PATENT NO. | : 9,058,498 B2 | Page 1 of 1 |
| APPLICATION NO. | : 13/547274 | |
| DATED | : June 16, 2015 | |
| INVENTOR(S) | : Hans | |

It is certified that error appears in the above-identified patent and that said Letters Patent is hereby corrected as shown below:

Title Page, item (56)

On page 2, column 2, under Other Publications, line 7, delete "GlobalPlatlform" and insert -- GlobalPlatform --, therefor.

In drawings,

On sheet 5 of 9, in figure 7, under Reference Numeral 710, line 1, delete "dispatchcr" and insert -- dispatcher --, therefor.

On sheet 5 of 9, in figure 7, under Reference Numeral 710, line 1, delete "runtimc componcnt rccciving a sccure" and insert -- runtime component receiving a secure --, therefor.

On sheet 7 of 9, in figure 10, under Reference Numeral 1020, line 1, after "encrypted" delete "the".

In specification,

In column 6, line 16, delete "ADDU)" and insert -- APDU) --, therefor.

In column 7, line 40, delete "framwork" and insert -- framework --, therefor.

In column 12, line 27, delete "FIG." and insert -- FIGS. --, therefor.

Signed and Sealed this
First Day of March, 2016

Michelle K. Lee
*Director of the United States Patent and Trademark Office*